United States Patent

[11] 3,572,734

| [72] | Inventor | John E. Holt |
| | | Hampton, Conn. 06247 |
| [21] | Appl. No. | 763,176 |
| [22] | Filed | Sept. 27, 1968 |
| [45] | Patented | Mar. 30, 1971 |

[54] SHAFT SEAL
8 Claims, 4 Drawing Figs.

[52] U.S. Cl. .................................................. 277/205, 277/165
[51] Int. Cl. .................................................. F16j 9/08, F16j 15/32
[50] Field of Search .......................................... 277/205, 165, 124, 200, 227

[56] References Cited
UNITED STATES PATENTS
| 2,417,828 | 3/1947 | Joy ............................. | 277/188X |
| 2,684,262 | 7/1954 | Neesen ....................... | 277/124 |
| 2,914,369 | 11/1959 | Hayman ..................... | 277/180UX |

FOREIGN PATENTS
| 7,142 | 3/1909 | Great Britain .............. | 277/205 |

*Primary Examiner*—Samuel B. Rothberg
*Attorney*—Curtis, Morris and Safford

ABSTRACT: A shaft seal formed of nylon and having a W-shape in radial cross section with a central hinge portion interconnecting two oppositely disposed V-portions and elastomer bodies filling the cavities formed by the walls of said V-portions.

PATENTED MAR 30 1971 3,572,734

INVENTOR.
John E. Holt
BY
Curtis, Morris & Safford
ATTORNEYS

SHAFT SEAL

This invention relates to seals and more in particular to flexible seals for shafts.

An object of this invention is to provide a seal that will prevent leakage between a shaft and the bore surrounding it. A further object is to provide such a seal that is adaptable for effective use under both high and low fluid pressures. A further object is to provide such a seal that will be effective both when the shaft is in motion and when it is static. A still further object is to provide a flexible seal that will prevent leakage in spite of severe runout of the shaft or misalignment of the shaft within the bore.

These and other objects will be in part obvious and in part pointed out below.

Figure 1:
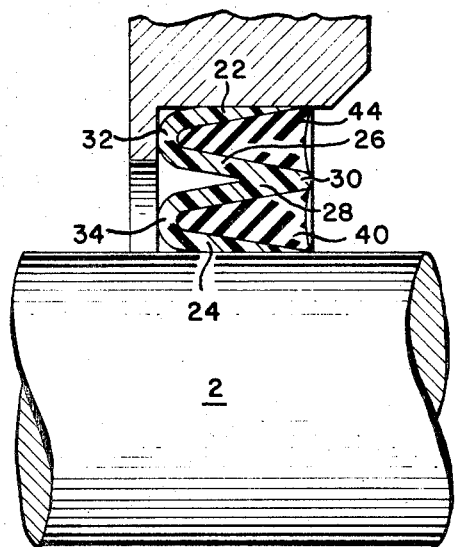
FIG. 1 is a side view of one embodiment of the invention with portions cut away in the lower portion of the FIG, and with the upper portion in vertical section.

Referring to FIG. 1, a cylindrical shaft 2 is mounted within a cylindrical casing bore 4 in the sidewall 8 of a closed casing. The axis of shaft 2 is generally the same as that of bore 4, although misalignment of two axes is one of the possibilities provided for by the present invention. The fluid whose flow is to be stopped is confined in the casing at the right-hand end of the bore. An annular shaft seal 6 fills the space between shaft 2 and the wall 8 of bore 4, preventing the escape of the fluid to the left.

Figure 2:
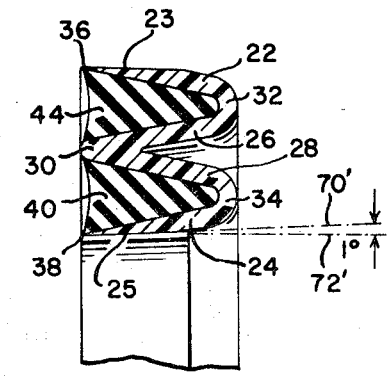
FIG. 2 is a view similar to the upper portion of FIG. 1 but showing the shaft seal alone.

Bore 4 is enlarged at the right to provide a housing 10 for seal 6 with a ledge at the left against which seal 6 is positioned. The main body of seal 6 is a nylon W-sheath element 20 formed of two interconnected V-portions 17 and 19 and comprising outer and inner substantially cylindrical walls 22 and 24, a pair of frustoconical walls 26 and 28 and three annular hinge portions or walls 30, 32 and 34. Hinge portion 32 interconnects walls 22 and 26 to form the portion 17, hinge portion 34 interconnects walls 28 and 24 to form V-portion 19, and hinge portion 30 interconnects walls 26 and 28 to connect the two V-portions into the integral W-sheath element. Walls 26, 28, 32 and 34 are of substantially the same thickness throughout. However, each of walls 22 and 24 is tapered in thickness from that of the other walls at the left to feather edges 36 and 38 at the right. Also, as shown in FIG. 2, when the seal is removed from housing 10 and shaft 2 and is in the free condition, the surfaces 23 and 25 of walls 22 and 24 are slightly frustoconical, diverging from left to right so that the diameter of surface 23 is slightly greater at the feather edge 36 than at the juncture of walls 22 and 32, and the diameter of surface 25 at feather edge 38 is slightly less than at the juncture of walls 24 and 34.

Positioned within and filling the annular space between walls 24 and 28 is a solid body or ring 40 of an elastomer which is molded in place and bonded to walls 24, 34 and 28 and a similar ring 44 is molded between walls 22 and 26 and bonded to walls 22, 26 and 32. Rings 40 and 44 act as displaceable or distortable solid-body springs tending to hold the walls of spring element 20 in their respective free positions, as shown in FIG. 2. However, when the seal is installed around shaft 2 and within housing 10, feather edges 36 and 38 are urged toward each other, thus exerting compressive forces which distort rings 40 and 44, respectively. Those compressive forces cause the rings to bulge out slightly, and the rings maintain reaction forces tending to return walls 24 and 26 and their feather edges to their free positions shown in FIG. 2.

Figure 3:
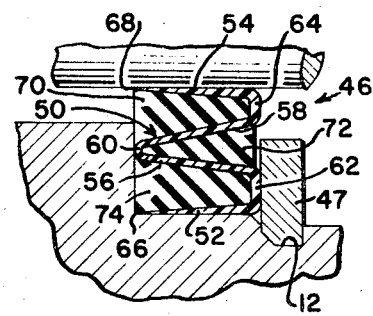

Referring to FIG. 3 of the drawings, a shaft seal 46 is shown which is similar to shaft seal 6. Shaft seal 46 is held in place by a resilient snap ring 47 of a standard type which is removably positioned in a groove 12 and extends radially inwardly along the outer periphery of the seal. The snap ring has a radial slot which forms free ends which may be urged toward each other to remove the snap ring from the slot.

Shaft seal 46 has a nylon W-sheath element 50 having outer and inner substantially cylindrical walls 52 and 54, a pair of frustoconical walls 56 and 58, a hinge portion or wall 60 interconnecting walls 56 and 58, a ring portion or annular wall 62 interconnecting walls 52 and 56, and a similar ring portion or annular wall 64 interconnecting walls 58 and 54. Walls 56, 58, 60, 62 and 64 are of substantially the same thickness throughout. Each of walls 52 and 54 is tapered in thickness from that of the other walls at the left to feather edges 66 and 68 at the right. Also, when the seal is removed from housing 10 and shaft 2 and is in the free condition, the surfaces of walls 52 and 54 are slightly frustoconical in the manner of surfaces 21 and 23 in FIG. 2.

Molded into the annular spaces between walls 54 and 58 and between walls 52 and 56 are rings 70 and 74, respectively, which are bonded to the walls and act the same as rings 40 and 44 in FIGS. 1 and 2. However, there is also a similar ring 72 molded between walls 56 and 58. Ring 72 acts to urge the two V-portions of the W-sheath spring element away from each other and aid the hinge portion 60 in performing the functions of the hinge portion 30 in FIGS. 1 and 2.

Figure 4:
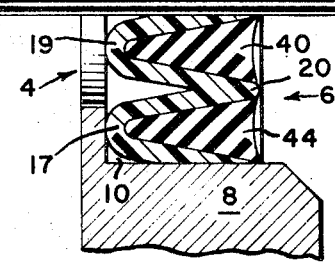
FIGS. 3 and 4 are views showing other embodiments of the invention.

In the embodiment of FIG. 4, W-sheath element 20 is the same as in FIGS. 1 and 2 but the elastomer rings are omitted. Hence, the natural resiliency of the W-sheath element is relied upon to provide the pressure holding the feather edge portions against the shaft and casing walls.

In each of the illustrative embodiments, the feather edge contacting the shaft is urged inwardly by virtue of the frustoconical shape of its inner peripheral surface. As shown best in FIG. 2, the angle of that surface (line 70') from the cylindrical shape (line 72') in the illustrative embodiments is 1°. It has been found that that annular relationship insures that a satisfactory seal will be maintained around the shaft with minimum radial pressure, and the friction and wear characteristics are well within acceptable limits.

The elastomer ring in each of the outer two cavities produces compression between the inner and outer feather edges. That is, each of the V-portions urges its feather edge outwardly away from the center hinge portion and the compressive forces on the two feather edge portions are in radial alignment. Hence, the feather edge portion at the shaft presses against the shaft surface so as to hold the entire feather edge tightly against the shaft so that the fluid is held from passing under the feather edge. With shaft seals of this general type the entry of fluid between the moving shaft and the mating surface of the seal tends to produce a condition where the fluid pressure pushes the seal away from the shaft, and that condition may make it necessary to provide relatively substantial forces holding the seal against the shaft. With the present invention, there are operating conditions whereby the fluid does not enter between the shaft and the feather edge portion, and the pressure required to hold the feather edge portion against the shaft is relatively small as compared with the forces which would be required with prior constructions. When the cavities or spaces adjacent the inner and outer peripheral walls of the seal are filled with elastomer and the center cavity is hollow, i.e., unfilled, as in the embodiment of FIGS. 1 and 2, the center hinge of the W-sheath element is strong enough to provide the necessary stability. When the center hinge portion is reinforced by elastomer in the center cavity (FIG. 3), the entire seal is distortable and the annular will portions 62 and 64 provide a substantial component of stability. Those annular walls are urged apart by the elastomer ring 72 in the cavity between them. Simultaneously, the elastomer rings 70 and 74 urge the feather edge 68 against the shaft in the manner discussed above. In this embodiment, the cavity at the outer peripheral wall is "overfilled" with the elastomer ring 74, and the outer periphery of the seal is clamped between snap ring 47 and the ledge 11. That provides a stationary fixed seal at the outer periphery of the seal.

In the discussion above the term "feather edge" is used to designate a relatively sharp edge formed by two intersecting surfaces. It is indicated that the W-sheath elements are made of molded nylon which is a polyamide which is an engineering plastic characterized by high bearing lubricity and high resistance to flexural fatigue. The elastomer may be any of various materials having the characteristics discussed, e.g., natural rubber and various synthetic rubbers. The terms "W-member" and "V-portions" are used in their broader senses to define the cross-sectional shapes such as those of the illustrative embodiments. The term "fluid" is used in its broader sense to include gases and other flowable materials. The seals are usable to prevent leakage of dust and granular materials, as well as liquids and gases. In the illustrative embodiments the feather edges are illustratively at an angle of 1° from a cylindrical surface. In accordance with the invention the angle of the feather edge surface must be such as to provide draft adequate to permit progressive interference between the seal and the shaft or bore, reaching maximum deflection at the feather edge. The V-portion adjacent the feather edge provides the desired pressure and flexibility and it is mounted at its outer periphery to provide the desired adaptability for the particular installation.

In the discussion above it has been indicated that the elastomer is "bonded" to the nylon and this may be more mechanical than chemical or thermal-fusion.

It has been indicated above that a cavity may be unfilled and that its hinge must then provide the desired resiliency. Also, for example, the invention contemplates that with the embodiment of FIG. 1 ring 44 could be omitted so that its cavity would be unfilled and that ring 40 would be in place. In that way ring 40 would provide maximum sealing on the shaft and with the seal would have maximum flexibility because of the unfilled outer cavity.

I claim:

1. A shaft seal construction for use between the peripheral surface of a shaft and a wall opening in which the shaft is positioned wherein it is desirable to prevent leakage along said peripheral surface from one side of the wall to the other and with minimum interference with relative movement between said peripheral surface and the seal, a relatively resilient W-member which is W-shaped in radial cross section with a central hinge portion interconnecting two oppositely disposed V-portions, each of said V-portions comprising two interconnected walls with a cavity therebetween, one of said V-portions having a free edge portion of one wall resting against said peripheral surface of the shaft in sealing relationship, and elastomer bodies filling said cavities and providing fluid pressure resisting the movement of said walls of each of said V-portions toward each other, whereby said free edge portion is resiliently urged against said peripheral surface by the fluid pressure of the adjacent elastomer body.

2. A shaft seal construction as described in claim 1 wherein said relatively resilient W-member is formed of a thin wall of nylon and wherein said elastomer bodies are molded in their respective cavities and bonded to the adjacent wall surfaces.

3. A shaft seal construction as described in claim 2 which is annular and is adapted to nest within a wall cavity which presents a cylindrical outer surface which compresses the outer wall of said relatively resilient W-member radially inwardly, and wherein a shaft having an outer peripheral surface may be positioned within said seal construction and press said free edge portion radially outwardly.

4. A shaft seal construction as described in claim 1 wherein said relatively resilient W-member is annular and is formed of a polyamide and has an annular cavity between said V-portions, and a body of elastomer substantially filling said annular cavity.

5. A shaft seal construction as described in claim 4 wherein the polyamide is nylon.

6. A shaft seal construction as described in claim 1 wherein said relatively resilient W-member is annular and is formed of nylon, and the combination therewith of a wall construction which compresses said shaft seal construction at its outer periphery and a shaft positioned within said wall construction and holding said free edge portion radially outwardly.

7. A shaft seal construction as described in claim 1 wherein said relatively resilient W-member is annular and is of nylon and has a free edge portion at its outer periphery similar to the first-described edge portion, each of said free edge portions being tapered and providing a feather edge.

8. A shaft seal construction as described in claim 1 wherein the surface of said free edge portion which contacts said peripheral surface is frustoconical converging toward said free edge.